United States Patent [19]

Ansteth

[11] Patent Number: 4,580,446

[45] Date of Patent: Apr. 8, 1986

[54] DEGREE WHEEL AND METHOD OF USING THE SAME

[76] Inventor: John J. Ansteth, 2233 Star Ct., Auburn Heights, Mich. 48057

[21] Appl. No.: 599,542

[22] Filed: Apr. 12, 1984

[51] Int. Cl.$^4$ ............................................ G01M 15/00
[52] U.S. Cl. ................................ 73/116; 33/181 AT; 116/DIG. 21
[58] Field of Search ............ 73/116, 118; 33/180 AT, 33/181 AT, 1 N; 116/DIG. 21, 230, 231, 311

[56] References Cited

U.S. PATENT DOCUMENTS

| | | | |
|---|---|---|---|
| 3,283,569 | 11/1966 | King et al. | 73/116 |
| 3,949,702 | 4/1976 | DeLong | 116/DIG. 21 |
| 4,081,995 | 4/1978 | Griffith et al. | 73/116 |
| 4,262,526 | 4/1981 | Makita | 73/116 |
| 4,263,868 | 4/1981 | Fukui | 116/70 |
| 4,296,629 | 10/1981 | Vuyovich | 73/116 |

OTHER PUBLICATIONS

B. Pendergast, "Valve Timing", *Speed Tuning and Trouble Shooting*, pp. 46–53, 1963.

*Primary Examiner*—Stephen A. Kreitman
*Attorney, Agent, or Firm*—Gifford, Groh, VanOphem, Sheridan, Sprinkle & Dolgorukov

[57] ABSTRACT

An improved degree wheel device includes a degree wheel which is adjustably rotatable relative to the crankshaft on which it is carried. The wheel can be easily adjusted so that a zero degree reading corresponds to top dead center of piston travel. Much of the calculation necessary to determine cam phasing, cam lobe centerline, valve overlap, and the like is thereby eliminated. The degree wheel preferably includes counterclockwise 0° to 360° indicia for a direct and calculation-free determination of the duration of tappet lift.

22 Claims, 6 Drawing Figures

DEGREE WHEEL AND METHOD OF USING THE SAME

BACKGROUND OF THE INVENTION

I. Field of the Invention

The present invention is directed to a device for determining the structural operating characteristics of automobile engines, and, more particularly, to a degree wheel useful in determining the operation of intake and exhaust valves in relation to the top dead center position of their associated piston.

II. Description of the Prior Art

Degree wheels have long been used to determine structural characteristics of automobile engines. Such engines conventionally comprise a crankshaft, one or more pistons operatively connected to the crankshaft by a crank, and a camshaft operatively connected to the crankshaft by means such as gears and/or a timing chain. The camshaft includes cam lobes which cause lifters to open or close the intake and exhaust valves of the cylinders upon rotation of the camshaft. The structural characteristics of the engine to be determined include a determination of the top dead center positions of the pistons, the positions of the intake and exhaust cam lobe center lines relative to the top dead center position, the duration of the valve opening (by determination of the duration of the cam lobe), the overlap of lobe lift, cam phasing and the like. In a conventional four stroke engine, the crankshaft will turn twice per engine cycle, and the camshaft once per engine cycle.

Conventional degree wheels bear degree indicia on one face, disposed at the periphery of the wheel. The degree indicia are conventionally numbered every ten (10) degrees, and are marked with one of two ranges. In one type of degree wheel, degrees are marked by quadrant. From top dead center, extending in either direction, degree readings increase from 0 to 90 degrees, and then decrease back to 0, meeting at bottom dead center on the degree wheel. In another type of degree wheel, the degree markings range from 0° to 180° in each direction, increasing from top dead center to bottom dead center.

In use, either type of degree wheel is rigidly fixed to the crankshaft pulley, with the face of the wheel bearing the degree indicia facing away from the crankshaft. An indicator which registers with the degree indicia is affixed to the engine. The engine is then manually rotated until the desired structural events occur, and corresponding degree readings are obtained.

For example, the location of top dead center for a particular piston is conventionally determined by the travel of the piston to symmetrical points of depth in its cylinder. A depth gauge is used to determine when the symmetrical depths are achieved. A degree reading is obtained for each of these locations, and the midpoint between these two degree readings is the top dead center of piston travel. Bottom dead center of piston travel can be similarly calculated. This method is more accurate than attempting to determine the point of extreme piston travel by direct inspection, because piston travel within the cylinder is at its minimum at top or bottom dead center.

Once the top dead center or bottom dead center positions are determined, the operator can then determine the angular positions where structural events such as the opening and closing of the valves occurs. These positions are determined by measurement of the angular positions of the corresponding cam lobes on the camshaft. The same depth gauge can be employed, abutting either the cam lobe itself, or the upper surface of the lifter which travels on the cam lobe.

Several problems arise in this process. Because many events occur more than either 90° or 180° after top dead center, some sort of notation must be made during the process of measurement, in order to remind the operator of the actual number of degrees traversed. Often it is not convenient to place tape or some other marking on the degree wheel, because of grease and oil present in the work environment. Since the degree wheel is affixed to the crankshaft, top dead center for a particular piston will generally not correspond to a reading of 0° without adjustment of the indicator or pointer. The calculations required to determine the positions of exhaust valve opening and closing, and of the cam lobe durations and center lines, becomes tedious and easily confused. For this reason, evaluation is often made only of the No. 1 cylinder, and this value presumed to be correct for the remaining cylinders. This is, of course, unsatisfactory, since variations between the cam lobes is significant in predicting the performance of the engine. Because of the calculations involved and notations necessary, and the confusion experienced by operators in performing these tasks, it generally takes from one to several days to determine the structural characteristics of all 8 cylinders of an engine.

The way in which degree wheels are presently used also results in the shortening of the useful life of the degree wheel. Damage to the wheel can result because of its rigid affixment to the crankshaft pulley. Conventionally, a degree wheel is trapped between two washers and bolted to the crankshaft, and repeated attachment results in deformation of the wheel. Moreover, if the degree wheel is not firmly attached to the crankshaft, a deleterious change in position of the degree wheel relative to the crankshaft may result. Normally this change in position is viewed as defeating the utility of the degree wheel. The problem of achieving sufficient adjustability of the indicator which registers with the degree markings, while maintaining resistance of that indicator to inadvertent movement during use, has also been noted. Repeated adjustment of a simple rod bolted to the engine may result in its fracture or separation from the engine due to stress.

SUMMARY OF THE PRESENT INVENTION

The present invention overcomes these and other problems by first providing a novel degree wheel which is adjustably mounted to the crankshaft. The degree wheel is mounted to a bushing by a threaded nut, this nut being loosened or tightened as desired. The bushing, rather than the degree wheel itself, is firmly affixed to the crankshaft. Preferably, the bushing is affixed to the crankshaft by a bolt which is inserted into a coaxial hole in the end of the crankshaft. In order to accommodate engines of different sizes, the bushing hole is preferably oversized, and a corresponding washer is disposed between the bushing and the bolt. Thus, the degree wheel is carried in a selectively rotatable relationship with the crankshaft. In use, the degree wheel is first positioned so that the symmetrical points of travel of the piston correspond to equal degree readings on either side of the top dead center (0°) position on the degree wheel. The top dead center position is thereby determined directly. Obtaining a top dead center position corresponding to a 0° reading is a necessary prerequisite to a determination of lobe center lines, lobe duration and valve opening and closing positions.

The present invention also comprises the improvement of including counterclockwise and continuous 0° to 360° indicia on one side of the degree wheel. If the wheel is set to 0° at a point where a valve opens, the total duration of the cam lobe (the period when the associated valve is open), measured in crankshaft degrees (generally a bit more than 300°), can be determined by a direct reading. The need to record and sum several different segments of wheel travel is avoided. In the preferred embodiment, the degree wheel bears 0-90-0-90-0, 0-180-0, and 0-360 degree markings; four conventional wedges generally indicating the opening and closing positions of the intake and exhaust valves, relative to 0° top dead center; and two novel wedges indicating conventional locations for intake and exhaust cam lobe center lines, also relative to 0° top dead center.

The invention also includes a method for determining structural characteristics of the engine in a fashion similar to that traditionally performed, except that the novel degree wheel and connecting means of the present invention are employed.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
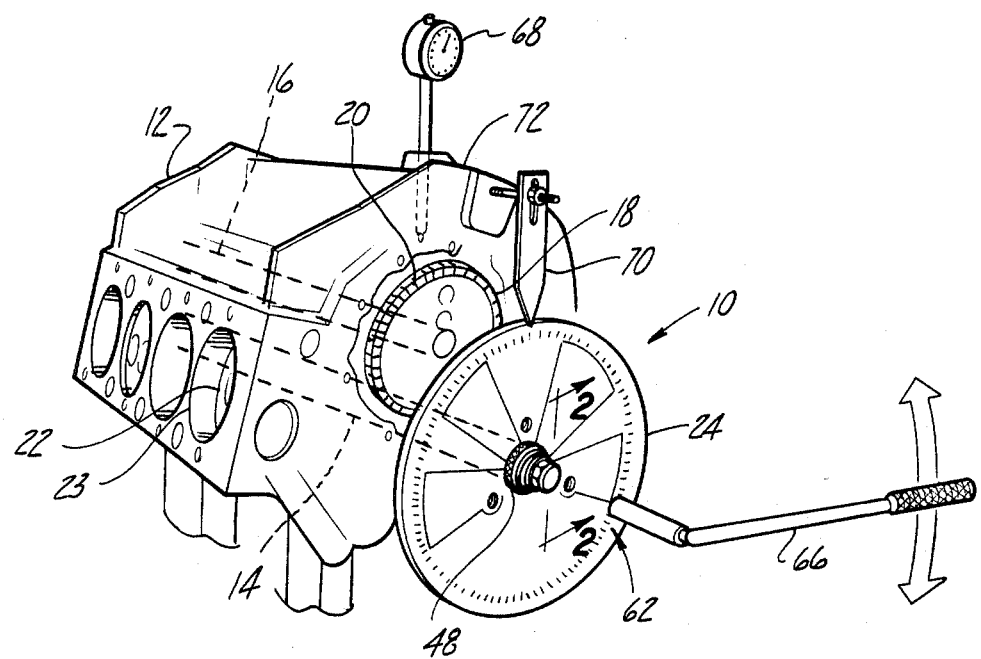
FIG. 1 is a perspective view of the preferred embodiment of the present invention.

With reference now to FIG. 1, the degree wheel assembly 10 according to the present invention is thereshown disposed on a partially assembled V-8 engine 12. The engine comprises a crankshaft 14 operatively connected to a camshaft 16 (both shown in phantom) by a camshaft gear 18 and a timing chain 20. Eight pistons 22 are disposed in eight (8) cylinders 23, four each disposed on either side of the engine 12.

Figure 5:
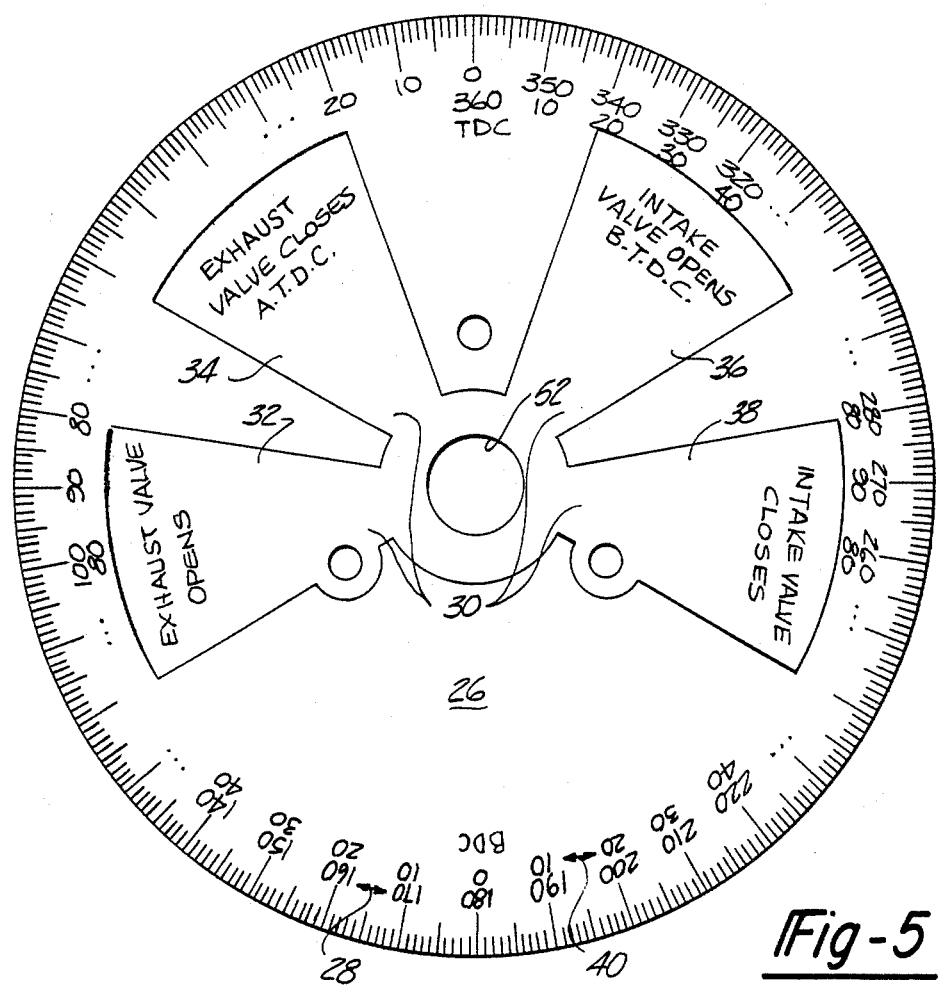
FIG. 5 is a front view of the preferred embodiment of the present invention.

The degree wheel device 10 according to the present invention first comprises a degree wheel 24 which is adapted to rotate in unison with the crankshaft 14. As is best shown in FIG. 5, on one side 26 of the degree wheel 24 are disposed various degree indicia. A 0° to 360° indicia 28 extends around the circumference of the wheel, increasing in number from 0° to 360° in a counterclockwise direction. Quadrants of conventional 0° to 90° indicia 40 are similarly disposed at the periphery of the wheel 24. Also on the side 26, conventional wedges 30 describing various structural events in the engine are included. Wedges 32, 34, 36 and 38 correspond to the ranges at which the exhaust and intake valves will open and close, respectively, relative to piston top dead center.

Figure 6:
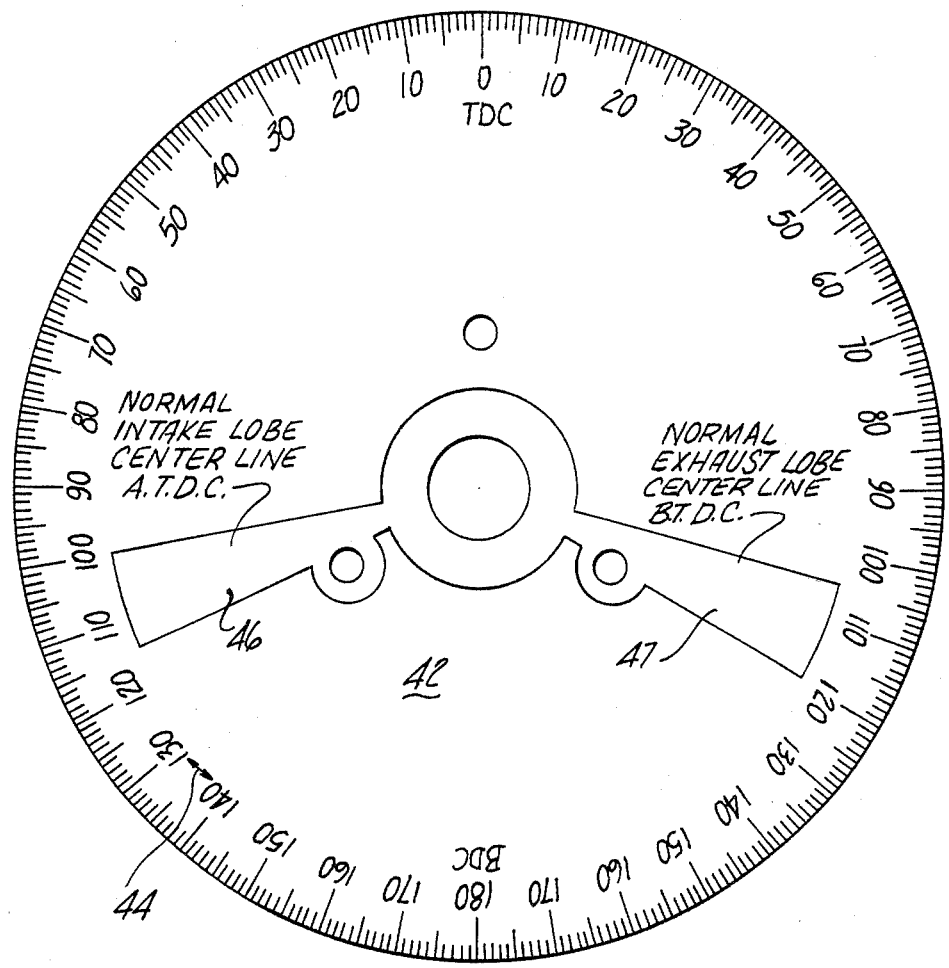
FIG. 6 is a rear view of the preferred embodiment of the present invention.

As can best be seen in FIG. 6, the other side 42 of the degree wheel includes a conventional 0° to 180° to 0° indicia 44, disposed on the periphery of the wheel 24 similar to the indicia 28. This side of the wheel bears novel wedges 46 and 47, referring to the conventional locations of the intake and exhaust lobe center lines, respectively, relative to piston top dead center.

Figure 2:
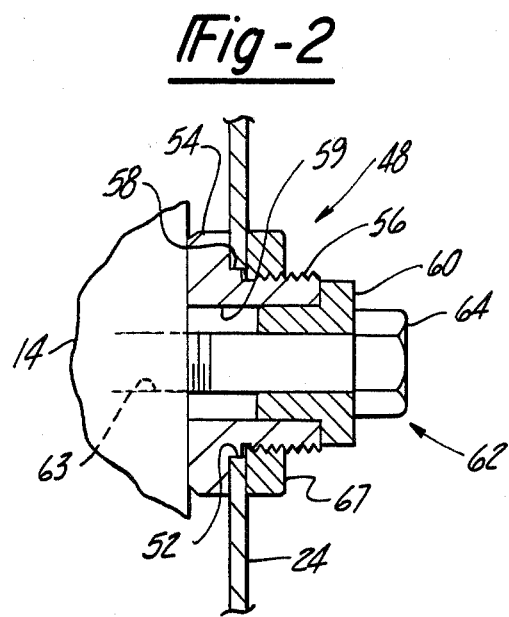
FIG. 2 is a cross-sectional view taken along line 2—2 of FIG. 1.
Figure 3:
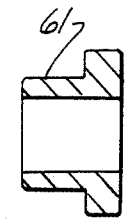
FIG. 3 is a cross-sectional view similar to that shown in FIG. 2, with parts removed for clarity.
Figure 4:
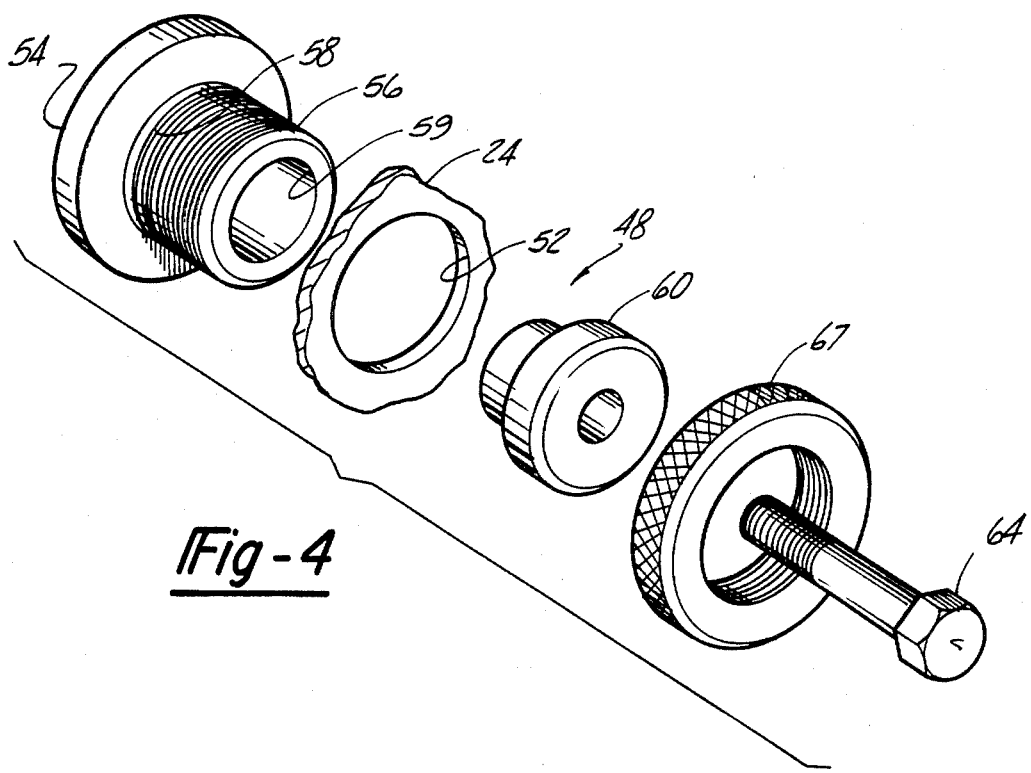
FIG. 4 is an exploded perspective view of the preferred embodiment of the present invention.

The degree wheel device 10 according to the present invention also comprises means 48 for carrying the degree wheel 24 on the crankshaft 14 in a selectively rotatable relationship with the crankshaft 14. With reference now to FIGS. 2 and 4, the carrying means 48 comprises a portion of the degree wheel 24 defining a hole 52 therethrough. The carrying means 48 further comprises a bushing 54 to which the degree wheel 24 is detachably mounted. The bushing 54 includes an externally threaded portion 56, having a diameter slightly less than that of the hole 52. The bushing 54 also includes a shoulder 58 having a diametrical width slightly less than but approximately equal to the diameter of the hole 52, and having a height less than the thickness of the degree wheel 24. The bushing 54 includes a central bore 59. A threaded nut 67 engages the threaded portion 56 of the bushing 54, abuttably trapping the degree wheel 24 therebetween.

The bushing 54 is affixed to the crankshaft by the insertion of a threaded bolt 64 therethrough. The bolt 64 is inserted into a correspondingly threaded hole 63 in the crankshaft, and tightened sufficiently to firmly affix the bushing 54 to the crankshaft 14. Preferably, the bore 59 is of a greater diameter than any hole 63 conventionally found in the end of the crankshaft 14. When the central bore 59 is oversize in this manner, a washer 60 is disposed between the bushing 54 and the bolt 64 to take up any slack therebetween, and to center the bushning 54 relative to the axis of the crankshaft 14.

Preferably, the bolt 64 is fastened to the crankshaft 14 with a torque approximately double the torque necessary to turn the crankshaft 14 about its axis. When this is done, the bolt 64 comprises a means 62 by which the crankshaft may be turned without grasping the degree wheel 24. Because the bolt 64 is affixed to the crankshaft 14 with an excess torque, the torque applied to the bolt 64 to turn the crankshaft 14 is not sufficient to loosen the bolt 64 from the threaded hole 63.

Use of the degree wheel device 10 of the present invention is straightforward. As is shown best in FIG. 1, the device 10 is employed with a conventional drive bar 66, a conventional depth gauge 68 and an adjustable indicator 70 in registration with the degree indicia 28, 40 or 44 on the degree wheel. As described below, the procedures for determining the structural characteristics of the engine are generally conducted in a conventional manner, except that the degree wheel is adjusted so that it will read 0° at the position of top dead center of a particular piston. The degree positions of the other structural events can then be calculated in the simplified manner as described.

The first steps in using the degree wheel device 10 of the present invention are to insert the appropriately sized bolt 64 through the correspondingly sized washer 60, insert both of these into the bore 59 in the bushing 54, and tighten the bolt 64 in the threaded hole 63 in the crankshaft 14. Because 30 to 35 foot-pounds of torque are generally necessary to turn the crankshaft of an 8 cylinder engine, the bolt 64 should be tightened to the crankshaft 14 with approximately 70 foot-pounds of torque. The drive bar 66 can then be used to turn the crank in either direction without loosening the bolt 64, the bolt 64 thereby serving as the turning means 62.

The threaded nut 67 is removed from the threaded portion 56 of the bushing 54, if it was not removed previous to attachment of the bushing 54 to the crankshaft 14. The degree wheel 24 is slipped over the threaded portion 56 and abutted against the bushing 54 about the shoulder 58. The nut 67 is then threaded over the threaded portion 56, and tightened sufficiently to secure the degree wheel 24 to the bushing 54. When it is desired to change the rotational position of the degree wheel 24 relative to the crankshaft 14, the nut 67 is loosened, the degree wheel 24 rotated, and the nut 67 retightened.

The degree wheel is useful for finding the exact top dead center and bottom dead center of each piston, the degrees of valve overlap and the duration of lobe lift, cam phasing and cam lobe center lines, and the total nominal duration and 0.050 inch lift duration of each tappet. For all but the total nominal duration and 0.050 inch lift duration, the 0° to 180° side of the degree wheel 24 (the other side 42) can be advantageously employed. For determining the total nominal duration and 0.050 inch lift duration of the tappet, the 0° to 360° side of the degree wheel 24 (the one side 26) must be used.

1. Finding Exact Top Dead Center

The indicator 70 is brought into registry with the degree indicia 44 on the degree wheel 24. The depth gauge 68 is mounted on a deck surface 72 of the engine block and adjusted so that its plunger extends about ⅛ inch into the cylinder 23 to be checked. The plunger of the gauge 68 should contact the piston 22 on its flat surface as close to the center of the piston 22 as possible. The crankshaft 14 is then rotated, by use of the drive bar 66 in cooperation with the bolt 64, until the piston 22 rises to approximately the top of its travel within the cylinder 23. The operator should push down on an edge of the piston 22 in order to rock it in the cylinder bore, to achieve a consistent measurement of position. The gauge 68 should then be zeroed, or the reading should be noted as the top of travel.

The crankshaft 14 should then be rotated counterclockwise (backwards) until the gauge reads more than 0.050 inches down from zero, or down from the top of travel reading. The operator should put pressure on the same side of the piston 22 as before, and rotate the crankshaft in the clockwise direction until the gauge reads exactly 0.050 inches down. The nut 67 is then loosened, and the degree wheel 24 rotated independently of the crankshaft 14 to read approximately 12° before top dead center. This is a nominal starting point that would vary with stroke and rod length. Pressure on the same side of the piston 22 is kept, and the operator should continue to rotate the crankshaft 14 in a clockwise direction until the piston rises to the top of its travel and then drops exactly 0.050 inches down in the bore again. If the degree wheel 24 reads more or less than 12° after top dead center, the nut 67 should be loosened and the degree wheel 24 rotated half the distance the 0.050 inch angle down reading and 12° after top dead center. This procedure should be repeated until the degree wheel 24 reads exactly the same number of degrees before and after top dead center, at piston depths of 0.050 inches before and after top dead center. The 0° or top dead center reading of the degree wheel 24 thus corresponds to the exact top dead center of the particular cylinder 23. It is a simple matter to repeat the procedure for each of the other cylinders 23, moving the depth gauge 68 to each of them in turn. Of course, such repositioning should be delayed until after the desired structural characteristics for each cylinder 23 are determined.

2. Checking Valve Overlap, Lobe Lift, Cam Phasing and Cam Lobe Center Lines

This procedure is a continuation of the procedure for finding the exact top dead center of a cylinder 23, and like the above procedure, should employ the side 42 of the degree wheel 24. The nut 67 should not be loosened, nor should the position of the degree wheel 24 relative to the camshaft 14 be changed from that obtained by the above procedure.

The depth gauge 68 should be relocated so that the plunger of the gauge is located at the top edge of the intake tappet, and so that the plunger is disposed parallel to the center line of the tappet bore. The crankshaft 14 should be rotated by turning the bolt 64 until the tappet is located at the bottom of its travel on the base circle of the intake cam. The gauge 68 should then be zeroed, or a reading corresponding to zero tappet height should be noted. The crankshaft 14 should then be rotated in a clockwise direction until the tappet lifts to the manufacturer's checking height for advertised or nominal duration. The nominal height for checking duration is typically the valve lash to rocker ratio, plus 0.003 inches (for compression of the valve train). The number of degrees before top dead center when this checking height is reached, corresponding to the location when the intake valve opens, should be recorded as degree reading G. The operator should continue to rotate the crankshaft 14 in a clockwise direction until the tappet reaches its maximum lift. This position should correspond to the intake lobe center line wedge 46. If it does not, the operator should check to see that the camshaft 16 has not been misaligned with the crankshaft 14, for example, by being spaced extra gear teeth.

While the tappet is at its maximum lift, the gauge should be zeroed, or the maximum lift height noted. The crankshaft 14 should then be rotated backwards, in a counterclockwise direction, until the indicator reads more than 0.050 inches down from the maximum lobe lift. The crankshaft 14 should then be rotated in the clockwise or normal direction until the guage 68 reads exactly 0.050 inches before maximum lobe lift. The number of degrees after top dead center corresponding to the 0.050 before maximum lobe lift should be noted as degree reading A. The operator should then continue to rotate the crankshaft in a clockwise or normal manner until the tappet reaches its maximum lift and then drops to exactly 0.050 inches after maximum lobe lift. The number of degrees after top dead center for the 0.050 after maximum lobe lift point should be noted as degree reading B.

The gauge 68 should be moved to the corresponding exhaust tappet and positioned similarly, and the entire procedure above repeated. The operator should keep in mind that the exhaust valve closes after top dead center while the exhaust lobe center line occurs before top dead center. The degrees after top dead center when the exhaust valve closes, when the tappet returns to the manufacturer's checking height for advertized or nominal duration (again typically the valve lash to rocker ratio plus 0.003 inches), should be noted as degree reading H. The number of degrees before top dead center at 0.050 inches before maximum lobe lift should be noted as degree reading D and the number of degrees before top dead center at 0.050 inches after maximum lobe lift sbould be noted as degree reading E. Of course, these readings refer to the exhaust lobe.

Degree readings A, B, D, E, G and H permit a calculation of the intake lobe centerline in degrees after top dead center, the exhaust lobe centerline in degrees before top dead center, the cam lobe centerline separation in cam degrees, and the degrees of valve overlap. The intake lobe centerline in degrees after top dead center equals the sum of degree readings A and B, divided by 2. This average should be noted as degree reading C. Similarly, the exhaust lobe center line and degrees before top dead center is the sum of degree readings D and E, divided by 2. The average should be noted as degree reading F. The cam lobe centerline separation in crankshaft degrees is the sum of degree reading C and F. The cam lobe centerline separation in cam degrees in the sum of degree readings C and F, divided by 2, since the crankshaft turns twice for every rotation of the camshaft. Finally, the sum of G and H equals the degrees of valve overlap for that cylinder.

At this point the operator may decide to degree the camshaft according to the data for this one cylinder only, or the procedure can be continued for the rest of the cylinders, and an average degree result for the camshaft can be calculated.

3. Checking the Total Advertized or Nominal Duration and 0.050 Inch Lift Duration The degree wheel device 10 according to the present invention provides a direct readout in crankshaft degrees of both the total advertised or nominal duration and the 0.050 inch lift duration of tappet lift. The side 26 of the degree wheel 24 bearing the counterclockwise 0° to 360° indicia 28 thereon is advantageously employed for this purpose. If the side 26 of the degree wheel 24 is not so disposed, the nut 67 should be loosened and the degree wheel 24 placed upon the bushing 54 so that the side 26 bearing the 0° to 360° indicia 28 faces outward from the crankshaft. The nut 67 should be tightened.

The depth gauge 68 should be mounted on the surface of the engine block 12 and adjusted so that the plunger of the gauge 68 contacts the top edge of the tappet and so that the plunger is disposed parallel to the centerline of the tappet board. The crankshaft 14 should be rotated in a clockwise fashion until the tappet has dropped to its lowest point and is on the base circle of the cam lobe. The gauge 68 should be zeroed, or its value noted as corresponding to 0 lift.

The operator should then continue to rotate the crankshaft 14 in a clockwise direction until the tappet lifts to the point at which it is desired to check duration. This can be the point of the manufacturer's checking height for advertised or nominal duration (typically the valve lash to rocker ratio plus 0.003 inches), or a 0.050 inch tappet lift. The indicator 70 should be brought into registry with the degree readings on the periphery of the degree wheel 24, the nut 67 loosened and the degree wheel adjusted to 0°. The nut should be then tightened sufficiently to keep the degree wheel 24 from changing position relative to the crankshaft 14.

The operator should then rotate the crankshaft 14 in a clockwise direction until the tappet rises to its maximum lift and then drops back to the checking height (either 0.050 inch, or advertised or nominal) on the closing side of the cam lobe. The degree reading on the degree wheel 24 then directly gives the exact duration of the cam lobe at the particular value of checking lift that was selected. This corresponds to the period of rotation during which the particular valve opens and closes. The procedure is repeated for checking the duration of that particular cam lobe at different tappet lifts, or repeated for the cam lobes for the other valves. No calculations are necessary to determine the duration of tappet lift, nor does the operator need to note any reversal of the increase or decrease of degree readings, since the indicia 28 read directly from 0° to 360°.

In practice, use of the degree wheel 24 and carrying means 48 of the present invention results in a savings of 80 or 90 percent of the time necessary to determine the structural characteristics of an engine. In combination, they provide simple and direct readings of the angular differences corresponding to the structural events in the engine—the opening and closing of the intake and exhaust valves, relative to the position of the associated piston. Using conventional techniques and the calculations required an operator typically needs from 1 to 2 full working days to completely degree an engine. This time is reduced to approximately 1 and ¼ hours using the present invention.

The advantage of having a degree wheel reading from 0° to 360° is clear. The intake and exhaust valves will generally be open for approximately 300 crankshaft degrees, depending upon the amount of tappet lift at which duration is defined. With conventional degree wheels, the 300 degree arc will cross 2 or more points at which the numbering of degrees on a conventional degree wheel reverses. This makes the calculation of the duration of tappet lift complex.

The need for an accurate determination of cam lobe centerlines and cam phasing is clear. This is especially true of camshafts having a narrow cam lobe central line separation. A narrow separation would typically be on the order of 103 or 104 cam degrees of separation. A variance in phasing between the various cams of only 2 degrees can result in a loss of as much as 50 horsepower when the engine is operated. When the cam lobe centerline separation and cam degrees is wider, for example, between 112 and 114 cam degrees, this phasing is not so critical. It is significant for engine performance and design to know whether the camshaft meets the specifications stated by the manufacturer, or whether a problem of cam phasing exists. By the adjustable nature of the degree wheel of the present invention and its counterclockwise 0° to 360° reading, the calculation of degree parameters for the engine is made significantly easier. The placement of the wedges for cam lobe centerlines on the side of the wheel used for determining top dead center is a special convenience, since the wedges permit a visual inspection of whether the camshaft gear and timing chain have been misaligned by a single gear tooth. Although the information is well known, applicant knows of no degree wheel which has ever employed wedges to identify the cam lobe centerlines.

Having described my invention, however, many modifications thereto will become apparent to one skilled in the art to which it pertains without deviation from the spirit of the invention as defined by the scope of the appended claims.

I claim:

1. A device for obtaining degree readings corresponding to structural events in a crankshaft-camshaft assembly; said assembly including a crankshaft, at least one piston operatively connected thereto, and a camshaft operatively connected to said crankshaft, said camshaft including at least one cam lobe corresponding to said at least one piston; said device comprising:

a degree wheel with degree indicia disposed on one face thereof; and means for carrying said wheel on said crankshaft in a selectively rotatable relationship therewith, said carrying means being affixable to said crankshaft;

wherein said degree wheel is rotatable either free of or in concert with said crankshaft; without removal therefrom.

2. The invention according to claim 1, wherein said carrying means includes means for turning said crankshaft.

3. The invention according to claim 2, wherein said turning means comprises a bolt having a head extending away from said crankshaft.

4. The invention according to claim 1, wherein said carrying means comprises a bushing affixable to said crankshaft.

5. The invention according to claim 4, wherein said carrying means additionally comprises a bolt engageable with said crankshaft.

6. The invention according to claim 5, wherein said carrying means further comprises a washer disposable between said bushing and said bolt, whereby said bolt retains said bushing on said crankshaft.

7. The invention according to claim 4, wherein said carrying means comprises a portion defining a center hole in said wheel, a threaded portion on the exterior of said bushing having a diameter less than the diameter of said center defining portion of said wheel, and a threaded nut engageable with said threaded portion of said bushing to retain said wheel thereon.

8. The invention according to claim 1, wherein said carrying means includes means for turning said crankshaft, and said carrying means comprises a bushing affixable to said crankshaft.

9. The invention according to claim 8, wherein said turning means comprises a bolt engageable with said crankshaft.

10. The invention according to claim 8, wherein said carrying means further comprises a washer disposable between said bushing and said bolt, whereby said bolt retains said bushing on said crankshaft.

11. The invention according to claim 8, wherein said carrying means comprises a portion defining a center hole in said wheel, a threaded portion on the exterior of said bushing having a diameter less than the diameter of said center defining portion of said wheel, and a threaded nut engageable with said threaded portion of said bushing to retain said wheel thereon.

12. The invention according to claim 1, wherein said indicia disposed on said one face of said degree wheel comprise indicia increasing from 0° to 360° in a counter-clockwise direction.

13. A device for obtaining degree readings corresponding to structural events in a crankshaft-camshaft assembly; said assembly including a crankshaft, at least one piston operatively connected thereto, and a camshaft operatively connected to said crankshaft, said camshaft including at least one cam lobe corresponding to said at least one piston; said device comprising:

a degree wheel with degree indicia disposed on one face thereof; and means for carrying said wheel on said crankshaft in a selectively rotatable relationship therewith, said carrying means being affixable to said crankshaft;

wherein said carrying means comprises a bushing affixable in said crankshaft, a portion defining a center hole in said wheel, a threaded portion on the exterior of said bushing having a diameter less than the diameter of said center defining portion of said wheel, and a threaded nut engageable with said threaded portion of said bushing to retain said wheel thereon; and wherein said bushing further comprises an annular shoulder somewhat adjacent said threaded portion, the diametrical width of said shoulder being less than but approximately equal to the diameter of said hole defining portion of said wheel, and the longitudinal height of said shoulder being less than the thickness of said wheel, whereby said retention of said wheel on said bushing occurs by abutment of said nut with said wheel when said nut is tightened on said threaded portion.

14. The invention according to claim 13, wherein said device includes means for turning said crankshaft engageable with said carrying means.

15. A device for obtaining degree readings corresponding to structural events in a crankshaft-camshaft assembly; said assembly including a crankshaft, at least one piston operatively connected thereto, and a camshaft operatively connected to said crankshaft, said camshaft including at least one cam lobe corresponding to said at least one piston; said device comprising:

a degree wheel with degree indicia disposed on one face thereof; and means for carrying said wheel on said crankshaft in a selectively rotatable relationship therewith, said carrying means being affixable to said crankshaft;

wherein said wheel additionally comprises wedges inscribed thereon indicating general degree ranges in which said structural events in said assembly occur, relative to the top dead center position of said at least one piston.

16. The invention according to claim 15, wherein said wedges comprise wedges on said face defining the opening and closing of intake and exhaust valves associated with said at least one piston, and on a face of said wheel opposite said one face defining the center lines of the intake and exhaust lobes on said camshaft associated with said piston.

17. In a method for determining a structural characteristic of a crankshaft-camshaft assembly; said assembly including a crankshaft, at least one piston operatively connected thereto, and a camshaft operatively connected to said crankshaft, said camshaft including at least one cam lobe corresponding to said at least one piston; said method comprising (a) attaching a degree wheel to said crankshaft; (b) placing an indicator in a stationary position in registration with said degree wheel; (c) obtaining a degree reading from the registry of said indicator and said wheel while rotationally positioning said assembly at a location whereat at least one structural event occurs, said reading thereby corresponding to said at least one event; and (d) calculating said structural characteristic from the degree reading obtained at said location of said at least one structural event; the improvement wherein said attachment step occurs by the fixing to said crankshaft of means for carrying said wheel in a selectively rotatable relationship relative to said crankshaft, such that said degree wheel can be rotated either free of or in contact with said crankshaft, without removal therefrom.

18. The invention according to claim 17, wherein said method is carried out with a degree wheel having a portion defining a central hole therein, and wherein said fixing step comprises (i) attachment to said crankshaft of a bushing having an external threaded portion, said threaded portion being of a lesser diameter than said hole defining portion; (ii) placing said wheel on said bushing by passage of said threaded portion through said hole; and (iii) threading a matchingly threaded nut onto said threaded portion to retain said wheel on said bushing.

19. The invention according to claim 17, wherein the attachment of said bushing to said crankshaft comprises the passing of a bolt through said bushing and the attachment of said bolt to said crankshaft in such a fashion so as to affix said bushing to said crankshaft.

20. The invention according to claim 19, wherein said improvement further comprises conducting said rotational positioning of step (c) by rotating said bolt in unison with said crankshaft.

21. The invention according to claim 19, wherein said attachment of said bushing to said crankshaft additionally comprises the insertion of a washer between said bolt and said bushing.

22. The invention according to claim 17, wherein said attachment step further comprises attaching a degree wheel having degree indicia disposed on one face thereof, said indicia increasing from 0° to 360° in a counterclockwise direction.

* * * * *